(12) United States Patent
Kusumi et al.

(10) Patent No.: US 7,401,170 B2
(45) Date of Patent: Jul. 15, 2008

(54) COMMUNICATION SYSTEM, AND MASTER APPARATUS AND SLAVE APPARATUS USED IN THE SAME, AND COMMUNICATION METHOD

(75) Inventors: Toru Kusumi, Osaka (JP); Yasuhiro Uno, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 212 days.

(21) Appl. No.: 11/482,873

(22) Filed: Jul. 10, 2006

(65) Prior Publication Data

US 2007/0016308 A1 Jan. 18, 2007

(30) Foreign Application Priority Data

Jul. 12, 2005 (JP) ............................. 2005-202758

(51) Int. Cl.
*G06F 13/12* (2006.01)
*G06F 13/00* (2006.01)
(52) U.S. Cl. .................... 710/65; 710/105; 709/208; 370/366

(58) Field of Classification Search ............. 710/62–74, 710/105–110; 709/208–212; 370/366
See application file for complete search history.

(56) References Cited

U.S. PATENT DOCUMENTS

| 5,777,870 | A * | 7/1998 | Takaku et al. .................. 700/3 |
| 5,835,936 | A * | 11/1998 | Tomioka et al. ............. 711/103 |
| 7,340,544 | B2 * | 3/2008 | Jeong ......................... 710/110 |
| 2004/0049798 | A1 * | 3/2004 | Ha .............................. 725/133 |

FOREIGN PATENT DOCUMENTS

JP 2000165421 6/2000

* cited by examiner

*Primary Examiner*—Christopher B Shin
(74) *Attorney, Agent, or Firm*—Dickinson Wright, PLLC

(57) ABSTRACT

This communication system performs serial data communication between a master apparatus and a plurality of the slave apparatus via a data transmission line. The master apparatus generates, by using a controller, a serial conversion order control signal for controlling serial conversion order for the data in the slave apparatus, and then transmits the signal to the slave apparatus. The slave apparatus sets up serial conversion order for system information data in accordance with the serial conversion order control signal, then performs serial conversion in accordance with the set-up order, and then transmits the serial conversion data to the master apparatus. The master apparatus can read the system information data in the slave apparatus in the order specified by the serial conversion order control signal.

8 Claims, 8 Drawing Sheets

| | Address | | | | | | | |
|---|---|---|---|---|---|---|---|---|
| | MSB | | | | | | | LSB |
| | 7 | 6 | 5 | 4 | 3 | 2 | 1 | 0 |
| Sub-address 0 | 65 | 66 | 67 | 68 | 69 | 70 | 71 | 72 |
| Sub-address 1 | 73 | 74 | 75 | 76 | 77 | 78 | 79 | 80 |
| Sub-address 2 | 81 | 82 | 83 | 84 | 85 | 86 | 87 | 88 |
| Sub-address 3 | 89 | 90 | 91 | 92 | 93 | 94 | 95 | 96 |
| Sub-address 4 | 97 | 98 | 99 | 100 | 101 | 102 | 103 | 104 |
| Sub-address 5 | 105 | 106 | 107 | 108 | 109 | 110 | 111 | 112 |
| Sub-address 6 | 113 | 114 | 115 | 116 | 117 | 118 | 119 | 120 |
| Sub-address 7 | 121 | 122 | 123 | 124 | 125 | 126 | 127 | 128 |
| Sub-address 8 | 1 | 2 | 3 | 4 | 5 | 6 | 7 | 8 |
| Sub-address 9 | 9 | 10 | 11 | 12 | 13 | 14 | 15 | 16 |
| Sub-address A | 17 | 18 | 19 | 20 | 21 | 22 | 23 | 24 |
| Sub-address B | 25 | 26 | 27 | 28 | 29 | 30 | 31 | 32 |
| Sub-address C | 33 | 34 | 35 | 36 | 37 | 38 | 39 | 40 |
| Sub-address D | 41 | 42 | 43 | 44 | 45 | 46 | 47 | 48 |
| Sub-address E | 49 | 50 | 51 | 52 | 53 | 54 | 55 | 56 |
| Sub-address F | 57 | 58 | 59 | 60 | 61 | 62 | 63 | 64 |

| | Address | | | | | | | |
|---|---|---|---|---|---|---|---|---|
| | MSB | | | | | | | LSB |
| | 7 | 6 | 5 | 4 | 3 | 2 | 1 | 0 |
| Sub-address 0 | | | | | | | | |
| Sub-address 1 | | | | | | | | |
| Sub-address 2 | | | | | | | | |
| Sub-address 3 | | | | | | | | |
| Sub-address 4 | | | | | | | | |
| Sub-address 5 | | | | | | | | |
| Sub-address 6 | | | | | | | | |
| Sub-address 7 | | | | | | | | |
| Sub-address 8 | | 1 | 2 | 3 | 4 | 5 | 6 | 7 | 8 |
| Sub-address 9 | | 9 | 10 | 11 | 12 | 13 | 14 | 15 | 16 |
| Sub-address A | | 17 | 18 | 19 | 20 | 21 | 22 | 23 | 24 |
| Sub-address B | | 25 | 26 | 27 | 28 | 29 | 30 | 31 | 32 |
| Sub-address C | | 33 | 34 | 35 | 36 | 37 | 38 | 39 | 40 |
| Sub-address D | | 41 | 42 | 43 | 44 | 45 | 46 | 47 | 48 |
| Sub-address E | | 49 | 50 | 51 | 52 | 53 | 54 | 55 | 56 |
| Sub-address F | | 57 | 58 | 59 | 60 | 61 | 62 | 63 | 64 |

FIG. 5

|  | \phantom{x} | MSB | | | Address | | | | LSB |
|---|---|---|---|---|---|---|---|---|---|
|  |  | 7 | 6 | 5 | 4 | 3 | 2 | 1 | 0 |
| Sub-address 0 | | 1 | 2 | 3 | 4 | 5 | 6 | 7 | 8 |
| Sub-address 1 | | 9 | 10 | 11 | 12 | 13 | 14 | 15 | 16 |
| Sub-address 2 | | 17 | 18 | 19 | 20 | 21 | 22 | 23 | 24 |
| Sub-address 3 | | 25 | 26 | 27 | 28 | 29 | 30 | 31 | 32 |
| Sub-address 4 | | 33 | 34 | 35 | 36 | 37 | 38 | 39 | 40 |
| Sub-address 5 | | 41 | 42 | 43 | 44 | 45 | 46 | 47 | 48 |
| Sub-address 6 | | 49 | 50 | 51 | 52 | 53 | 54 | 55 | 56 |
| Sub-address 7 | | 57 | 58 | 59 | 60 | 61 | 62 | 63 | 64 |
| Sub-address 8 | | | | | | | | | |
| Sub-address 9 | | | | | | | | | |
| Sub-address A | | | | | | | | | |
| Sub-address B | | | | | | | | | |
| Sub-address C | | | | | | | | | |
| Sub-address D | | | | | | | | | |
| Sub-address E | | | | | | | | | |
| Sub-address F | | | | | | | | | |

Address

| | MSB 7 | 6 | 5 | 4 | 3 | 2 | 1 | LSB 0 |
|---|---|---|---|---|---|---|---|---|
| Sub-address 0 | 1 | 2 | 3 | 4 | 5 | 6 | 7 | 8 |
| Sub-address 1 | 9 | 10 | 11 | 12 | 13 | 14 | 15 | 16 |
| Sub-address 2 | 17 | 18 | 19 | 20 | 21 | 22 | 23 | 24 |
| Sub-address 3 | 25 | 26 | 27 | 28 | 29 | 30 | 31 | 32 |
| Sub-address 4 | 33 | 34 | 35 | 36 | 37 | 38 | 39 | 40 |
| Sub-address 5 | 41 | 42 | 43 | 44 | 45 | 46 | 47 | 48 |
| Sub-address 6 | 49 | 50 | 51 | 52 | 53 | 54 | 55 | 56 |
| Sub-address 7 | 57 | 58 | 59 | 60 | 61 | 62 | 63 | 64 |
| Sub-address 8 | 65 | 66 | 67 | 68 | 69 | 70 | 71 | 72 |
| Sub-address 9 | 73 | 74 | 75 | 76 | 77 | 78 | 79 | 80 |
| Sub-address A | 81 | 82 | 83 | 84 | 85 | 86 | 87 | 88 |
| Sub-address B | 89 | 90 | 91 | 92 | 93 | 94 | 95 | 96 |
| Sub-address C | 97 | 98 | 99 | 100 | 101 | 102 | 103 | 104 |
| Sub-address D | 105 | 106 | 107 | 108 | 109 | 110 | 111 | 112 |
| Sub-address E | 113 | 114 | 115 | 116 | 117 | 118 | 119 | 120 |
| Sub-address F | 121 | 122 | 123 | 124 | 125 | 126 | 127 | 128 |

COMMUNICATION SYSTEM, AND MASTER APPARATUS AND SLAVE APPARATUS USED IN THE SAME, AND COMMUNICATION METHOD

BACKGROUND OF THE INVENTION

1. Field of Invention

The present invention relates to a data communication method and, in particular, to serial data communication for a television device, a video device, a DVD recorder device, an audio device, or the like.

2. Prior Art

In the prior art, methods of controlling data transfer are known in which a controlling semiconductor apparatus and a plurality of to-be-controlled semiconductor apparatuses are interconnected using two or three transmission lines. Among such techniques, the Philips INTER-IC (I2C) bus is described below.

Figure 6:
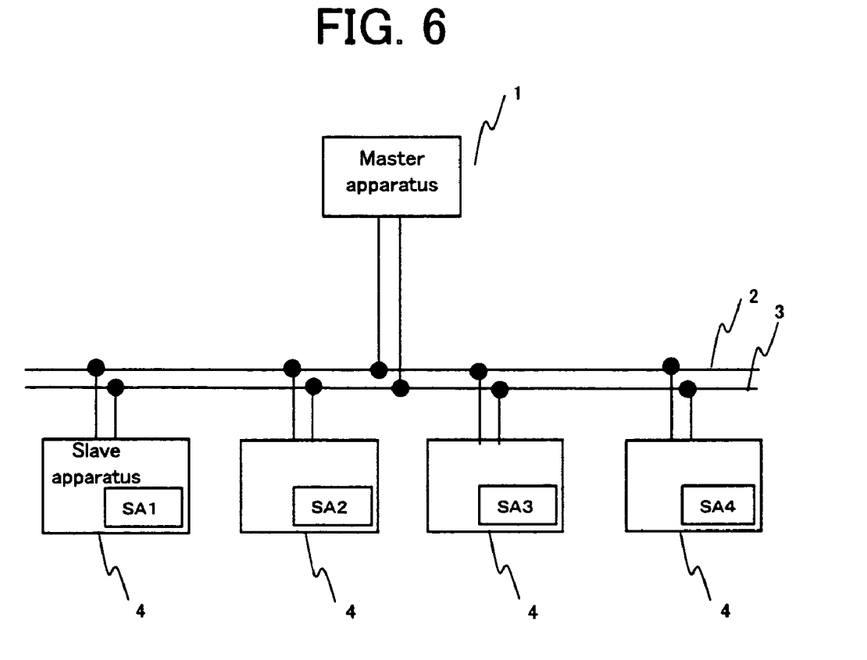
FIG. 6 is a diagram showing a configuration of an I2C bus.

An I2C bus is shown in FIG. 6. As shown in FIG. 6, in the I2C bus, a controlling semiconductor apparatus (referred to as a "master", hereinafter) 1 and a plurality of to-be-controlled semiconductor apparatuses (each referred to as a "slave", hereinafter) 4 are interconnected using two transmission lines 2 and 3. The master 1 controls each slave 4 via the transmission lines 2 and 3.

The master 1 is an apparatus that starts data transfer, then generates a clock signal, and then completes the data transfer. Each slave 4 is an apparatus addressed by the master 1. One of the two transmission lines is a line (referred to as a "serial clock line", hereinafter) 2 for transmitting the clock signal. This signal is transmitted by the master 1 and received by each slave 4. The other is a line (referred to as a "serial data line", hereinafter) 3 for transmitting data between the master 1 and each slave 4. This line is used for data transmission in order that the master 1 should control each slave 4. Then, the master 1 transmits data to each slave 4 by serial transmission.

A unique address (referred to as a "slave address", hereinafter) is provided to each slave 4. When controlling each slave 4, the master 1 first transmits to the serial data line 3 the slave address of the slave 4 to be controlled. Only when having received own slave address, each slave 4 receives data that follows the slave data. As such, since a unique address is provided to each slave 4, the serial clock line 2 and the serial data line 3 can be shared by these slaves 4.

Further, in the I2C bus, in response to an instruction from the master 1, the data held by each slave 4 can also be transmitted to the master 1 via the serial data line 3. The data transmission is performed in predetermined order. When no instruction is provided from the master 1, the data held by each slave 4 cannot be transmitted to the master 1. That is, complete two-way communication is not established between the master 1 and each slave 4.

Figure 7:
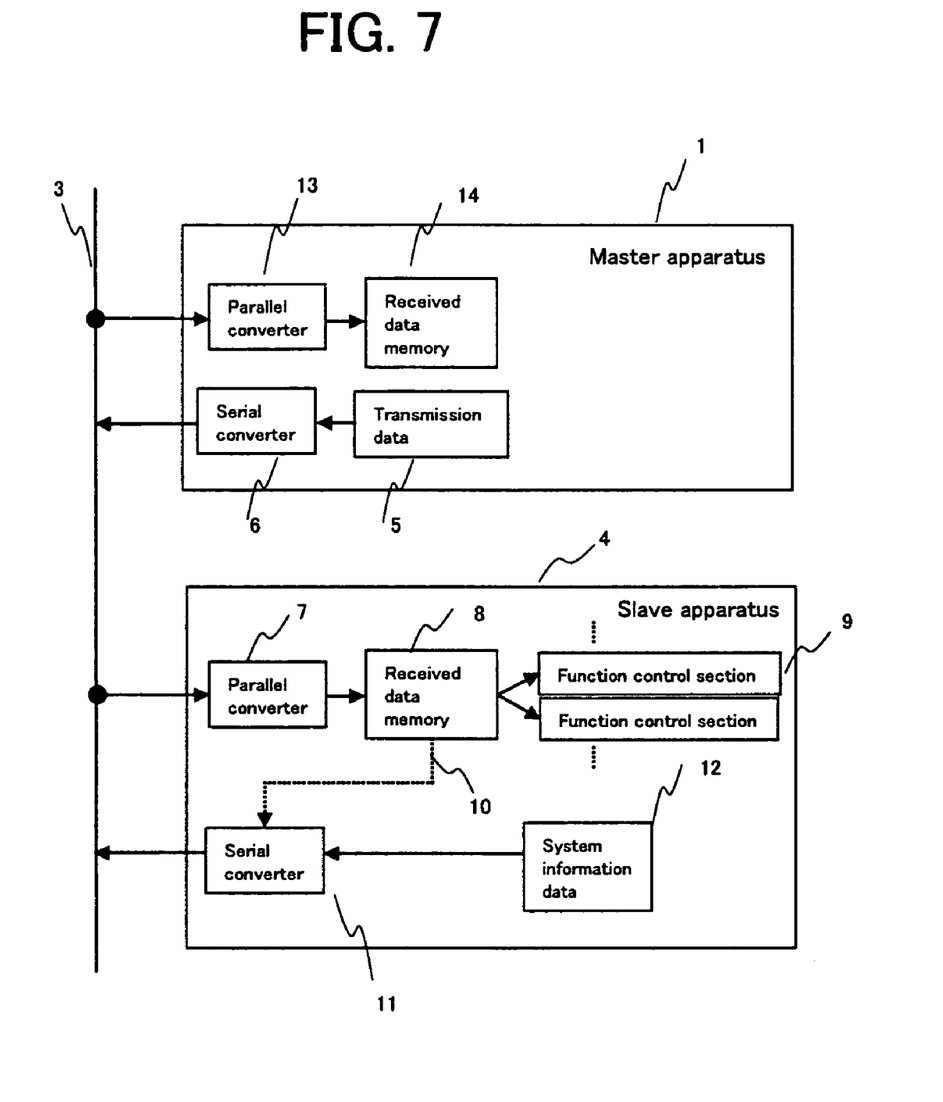
FIG. 7 is a diagram showing a configuration of a prior art communication system.

Next, an example of a system employing the above-mentioned I2C bus is described below. FIG. 7 is a diagram showing a configuration of a communication system employing an I2C bus shown in FIG. 6.

First, the operation is described that the master 1 writes data into the slave 4. In FIG. 7, the master 1 performs serial conversion on transmission data 5 by using a serial converter 6, and then transmits the converted data to the serial data line 3. The transmission data 5 consists of: slave address data (7 bits) of the slave 4; data write/read select data (1 bit) for the slave 4; and data for controlling the slave 4. The data write/read select data indicates that the data is written from the master 1 into the slave 4. The transmission data 5 is processed by serial conversion in the order of the slave address data, the data write/read select data, and the slave control data.

The slave 4 receives the data 5 transmitted from the master 1 to the serial data line 3. The received data 5 is processed by parallel conversion in a parallel converter 7, and then stored into a received data memory 8. The control data in the stored data 5 is transmitted to various kinds of function control sections 9 in the slave 4 so that the slave 4 is controlled on the basis of this data. Then, the operation is completed that the master 1 writes data into the slave 4.

Next, the operation is described that the master 1 reads data stored in the slave 4. Similarly to the above-mentioned write operation, the master 1 performs serial conversion on transmission data 5 by using the serial converter 6, and then transmits the converted data to the serial data line 3. The transmission data 5 consists of slave address data (7 bits) of the slave 4 and data write/read select data (1 bit) for the slave 4. Here, the data write/read select data indicates that the master 1 reads data from the slave 4. The transmission data 5 is processed by serial conversion in the order of the slave address data and the select data.

The slave 4 receives the data 5 transmitted from the master 1 to the serial data line 3. This data is processed by parallel conversion in the parallel converter 7, and then stored into the received data memory 8. The select data in the transmission data 5 is transmitted from the memory 8 through the read instruction signal line 10 to a serial converter 11. In accordance with the select data that indicates data read, the slave 4 performs serial conversion on system information data 12 in the slave 4 by using the serial converter 11, and then transmits the converted data to the serial data line 3.

The master 1 receives the data 12 transmitted to the serial data line 3, then performs parallel conversion on the received data by using the parallel converter 13, and then stores the converted data into a received data memory 14. Then, the operation is completed that the master 1 reads data stored in the slave 4.

As such, in the system of FIG. 7, the master 1 can write data into the slave 4 and read data from the slave 4.

Figure 8:
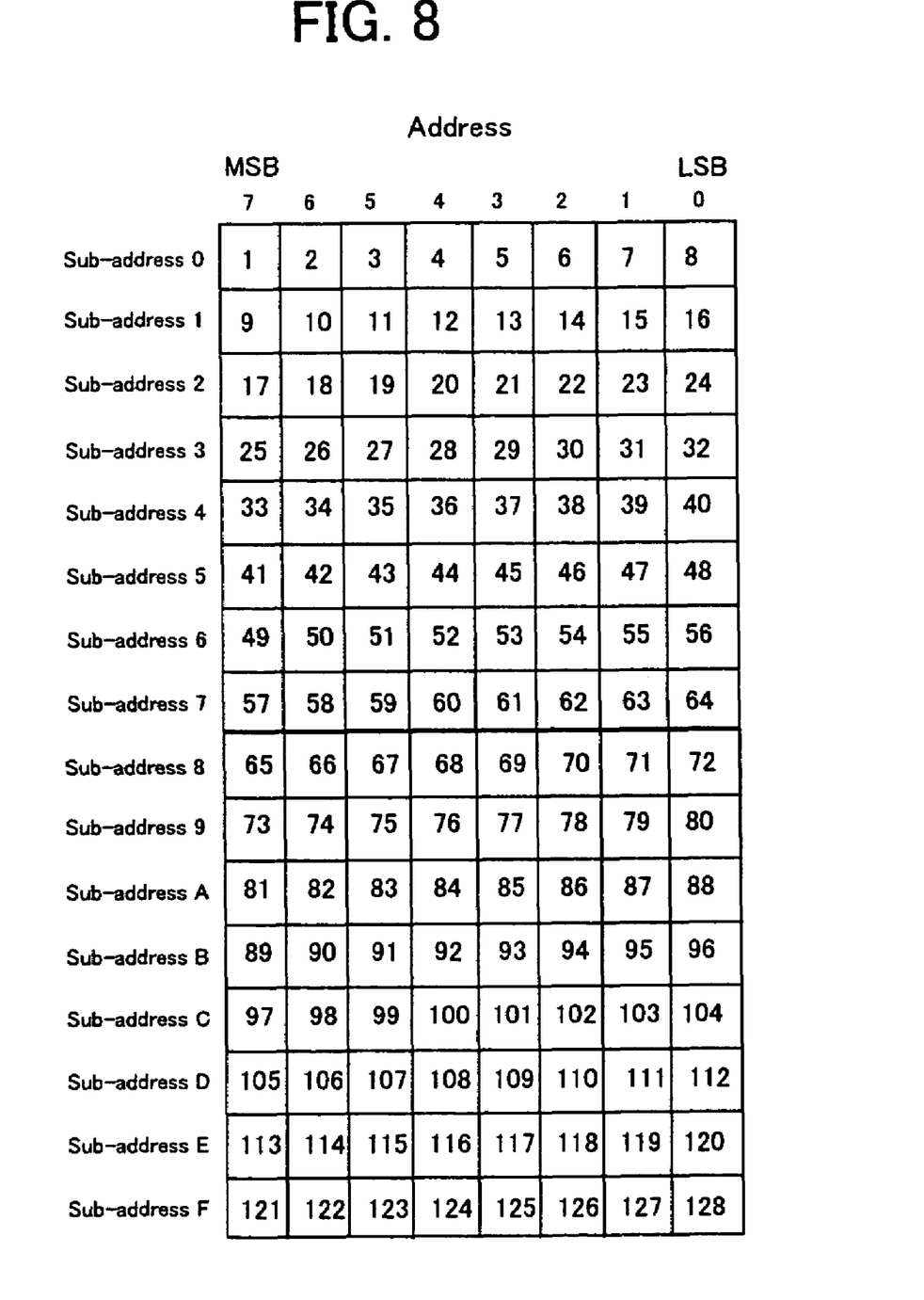
FIG. 8 is a diagram used for describing serial conversion order for system information data 12 of FIG. 7.

As for prior art document information concerning the present invention, for example, Non-Patent Document 1 is known Non-Patent Document 1: "The I2C-bus specification" http://www.semiconductors.philips.com/acrobat_download/lite rature/9398/39340011.pdf FIG. 8 shows an example of a data map of the system information data 12 of FIG. 7. This shows a case that the system information data 12 consists of 128 pieces of data. In FIG. 8, serial conversion order for the data 12 is set up in advance into the order from MSB to LSB and from sub-address 0 to sub-address F. In this case, the data 12 is processed by serial conversion in the order of the numerical values assigned in the grid sections of FIG. 8. For example, the data of sub-address E and address 7 is processed by serial conversion in the 113th turn, and then transmitted to the serial data line 3.

Nevertheless, in the system shown in FIG. 7, the read of the system information data 12 of the slave 4 has been performed by serial transmission. Thus, data processed in a later turn of serial conversion takes a longer time to be received by the master 1. That is, data having a larger numerical value in the grid section of FIG. 8 takes a longer time to be received by the master 1. This problem need be resolved in the situation that the amount of data transmitted from the slave 4 increases with increasing scale and increasing functional complexity in semiconductor apparatuses in recent years.

Further, even when the data transmitted from the serial converter 11 at the last is solely necessary, the master 1 need read the entire data of the system information data 12. Thus, the master 1 need be provided with a receiving memory 14 capable of holding the entire data of the slave 4. This unavoidably causes a size increase in the memory 14.

BRIEF SUMMARY OF THE INVENTION

The present invention has been devised in view of the above-mentioned situation. An object of the present invention is to provide a communication system and a communication method that allow desired data to be read at a high speed when a master reads data from a slave.

Another object of the present invention is to provide a communication system and a communication method in which necessary size is reduced in a memory in a master for holding read-out data when the master reads data from a slave.

In order to achieve the above-mentioned object, a first communication system of the present invention comprises: a first apparatus for controlling data transfer; a plurality of second apparatuses for exchanging data with the first apparatus; and a data transmission line connected between the first apparatus and the second apparatuses. The first apparatus comprises: a controller for generating a serial conversion order control signal for controlling serial conversion order for readable data when the readable data in the second apparatus is read; a first serial converter for performing serial conversion on data containing the serial conversion order control signal, and then transmitting the converted data to the second apparatus; and a first parallel converter for receiving the data generated by the serial conversion of the readable data performed by the second apparatus in accordance with the serial conversion order control signal, and then performing parallel conversion on the received data. The second apparatus comprises: a second parallel converter for receiving the serial conversion data transmitted from the first apparatus and then performing parallel conversion on the received data; a setting unit for setting up serial conversion order for the readable data in accordance with the serial conversion order control signal; and a second serial converter for performing serial conversion on the readable data in accordance with the set-up serial conversion order and then transmitting the converted data to the first apparatus.

According to the first communication system of the present invention, when reading readable data in the second apparatus (slave apparatus), the first apparatus (master apparatus) can instruct the second apparatus with respect to serial conversion order for the readable data in order that desired data among the readable data should be read first.

That is, the first apparatus generates a serial conversion order control signal for controlling serial conversion order for the readable data in order that desired data can be received first, and then transmits the signal to the second apparatus. Then, in accordance with the serial conversion order control signal, the second apparatus sets up serial conversion order for the readable data, then performs parallel conversion in this set-up order, and then transmits the converted data to the first apparatus.

Thus, the first apparatus can receive desired data among the readable data at a high speed. In particular, this system is remarkably effective in the situation that the amount of transmission data increases with increasing scale and increasing functional complexity in semiconductor apparatuses as in recent years.

The master apparatus used in the first communication system of the present invention is a master apparatus for controlling data transfer performed in a slave apparatus connected via a data transmission line, comprising: a controller for generating a serial conversion order control signal for controlling serial conversion order for readable data when the readable data in the slave apparatus connected via the data transmission line is read; a serial converter for performing serial conversion on data containing the serial conversion order control signal, and then transmitting the converted data to the slave apparatus; and a parallel converter for receiving the data generated by the serial conversion of the readable data performed by the slave apparatus in accordance with the serial conversion order control signal, and then performing parallel conversion on the received data.

The slave apparatus used in the first communication system of the present invention is a slave apparatus in which data transfer is controlled by a master apparatus connected via a data transmission line, comprising: a parallel converter for receiving serial conversion data transmitted from the master apparatus and then performing parallel conversion on the received data; a setting unit for setting up serial conversion order for readable data in accordance with a serial conversion order control signal which is contained in the parallel conversion data and which controls serial conversion order for the readable data in the slave apparatus; and a serial converter for performing serial conversion on the readable data in accordance with the set-up serial conversion order and then transmitting the converted data to the master apparatus.

A second communication system of the present invention comprises: a first apparatus for controlling data transfer; a plurality of second apparatuses for exchanging data with the first apparatus; and a data transmission line connected between the first apparatus and the second apparatuses. The first apparatus comprises: a controller for generating a serial conversion selection control signal for controlling selection of data to be processed by serial conversion among readable data when the readable data in the second apparatus is read; a first serial converter for performing serial conversion on data containing the serial conversion selection control signal, and then transmitting the converted data to the second apparatus; a first parallel converter for receiving =the data generated by the serial conversion of a part of the readable data performed by the second apparatus in accordance with the serial conversion selection control signal, and then performing parallel conversion on the received data; and a memory for temporarily holding the parallel conversion data. The second apparatus comprises: a second parallel converter for receiving the serial conversion data transmitted from the first apparatus and then performing parallel conversion on the received data; a selector for selecting data to be processed by serial conversion among the readable data in accordance with the serial conversion selection control signal; and a second serial converter for performing serial conversion on the selected data and then transmitting the converted data to the first apparatus.

According to the second communication system of the present invention, when reading readable data in the second apparatus (slave apparatus), the first apparatus (master apparatus) can instruct the second apparatus with respect to data to be processed by serial conversion among the readable data in order that necessary data among the readable data should solely be read.

That is, the first apparatus generates a serial conversion selection control signal for selecting data to be processed by serial conversion among the readable data in order that necessary data should solely be received, and then transmits the signal to the second apparatus. In accordance with this control signal, the second apparatus selects data requested by the first apparatus, then performs parallel conversion solely on this select data, and then transmits the converted data to the first apparatus.

This avoids the necessity that the first apparatus should be provided with a memory of a size allowing the entire readable data in the second apparatus to be held temporarily. This reduces apparatus cost, and hence remarkably useful in the situation that the amount of transmission data is increasing as in these days.

The master apparatus used in the second communication system of the present invention is a master apparatus for controlling data transfer performed in a slave apparatus connected via a data transmission line, comprising: a controller for generating a serial conversion selection control signal for controlling selection of data to be processed by serial conversion among readable data when the readable data in the slave apparatus connected via the data transmission line is read; a serial converter for performing serial conversion on data containing the serial conversion selection control signal, and then transmitting the converted data to the slave apparatus; a parallel converter for receiving =the data generated by the serial conversion of a part of the readable data performed by the slave apparatus in accordance with the serial conversion selection control signal, and then performing parallel conversion on the received data; and a memory for temporarily holding the parallel conversion data.

The slave apparatus used in the second communication system of the present invention is a slave apparatus in which data transfer is controlled by a master apparatus connected via a data transmission line, comprising: a parallel converter for receiving serial conversion data transmitted from the master apparatus and then performing parallel conversion on the received data; a selector for selecting data to be processed by serial conversion among readable data in accordance with a serial conversion selection control signal which is contained in the parallel conversion data and which controls selection of data to be processed by serial conversion among the readable data in the slave apparatus; and a serial converter for performing serial conversion on the selected data and then transmitting the converted data to the master apparatus.

Further, a first communication method of the present invention is a communication method used in a configuration provided with: a first apparatus for controlling data transfer; a plurality of second apparatuses for exchanging data with the first apparatus; and a data transmission line connected between the first apparatus and the second apparatuses, comprising the steps of:

a) generating, in the first apparatus, a serial conversion order control signal for controlling serial conversion order for readable data when the first apparatus reads the readable data in the second apparatus;

b) transferring data containing the serial conversion order control signal from the first apparatus through the transmission line to the second apparatus;

c) setting up serial conversion order for readable data in accordance with the serial conversion order control signal and then performing, in the second apparatus, serial conversion on the readable data in accordance with the set-up order;

d) transferring the serial conversion data from the second apparatus through the transmission line to the first apparatus; and e) performing parallel conversion on the serial conversion data in the first apparatus.

Further, a second communication method of the present invention is a communication method used in a configuration provided with: a first apparatus for controlling data transfer; a plurality of second apparatuses for exchanging data with the first apparatus; and a data transmission line connected between the first apparatus and the second apparatuses, comprising the steps of:

a) generating, in the first apparatus, a serial conversion selection control signal for controlling selection of data to be processed by serial conversion among readable data when the first apparatus reads the readable data in the second apparatus;

b) transferring data containing the serial conversion selection control signal from the first apparatus through the transmission line to the second apparatus;

c) selecting data to be processed by serial conversion among the readable data in accordance with the serial conversion selection control signal, and then performing serial conversion on the selected data in the second apparatus;

d) transferring the serial conversion data from the second apparatus through the transmission line to the first apparatus;

e) performing parallel conversion on the serial conversion data in the first apparatus; and f) temporarily storing the parallel conversion data into a memory in the first apparatus.

As described above, according to the present invention, a communication system and a communication method are provided that allow a master to read desired data from a slave at a high speed. Further, according to the present invention, a communication system and a communication method are provided in which data to be read from a slave is selected so that necessary size of a memory to be provided in a master is reduced.

DESCRIPTION OF THE PREFERRED EMBODIMENTS

First Embodiment

A communication system according to a first embodiment of the present invention is described below with reference to the drawings. Here, the same or like components as those of the background art are designated by the same or like reference numerals.

Figure 1:
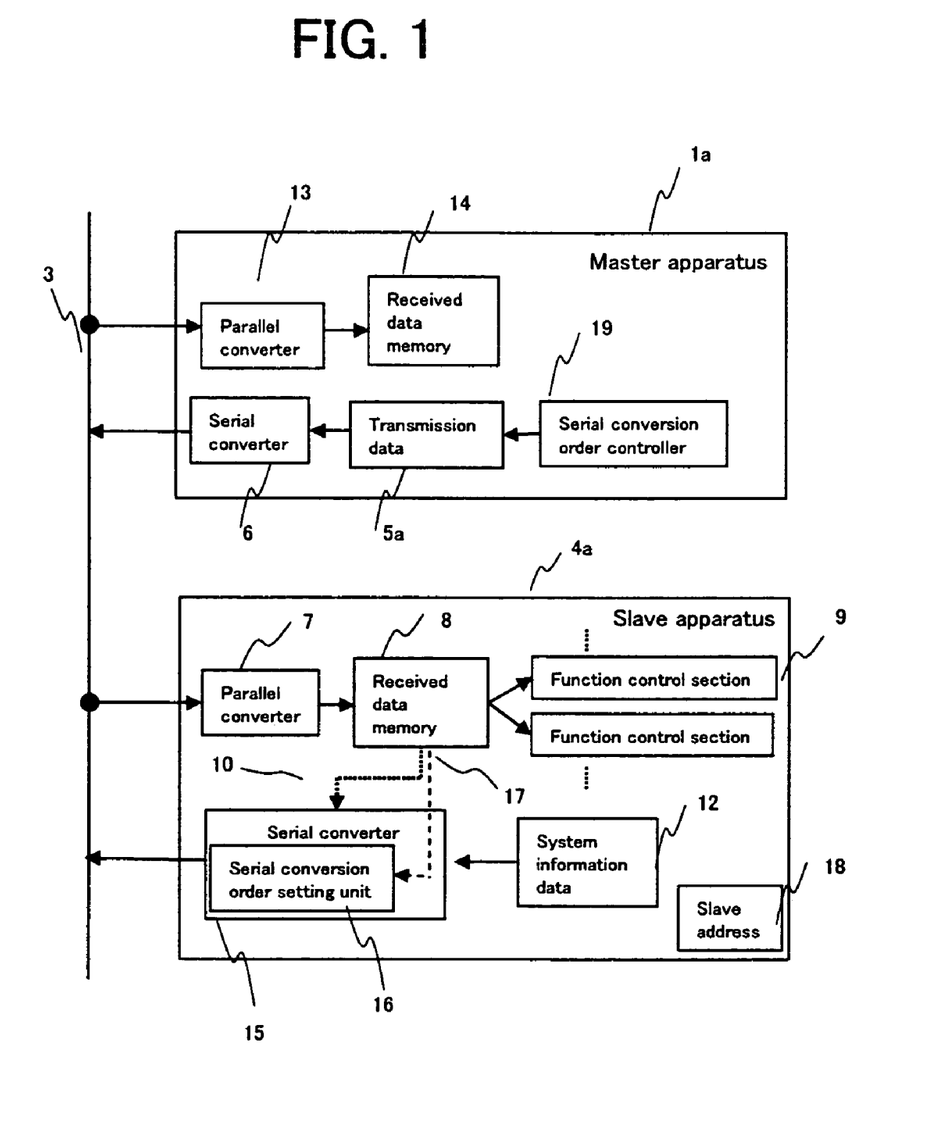
FIG. 1 is a diagram showing a configuration of a communication system according to a first embodiment of the present invention.

FIG. 1 is a diagram showing a configuration of a communication system according to a first embodiment of the present invention. As shown in FIG. 1, the communication system according to the present embodiment comprises: a master 1*a* for controlling data transfer; a slave 4*a* which is addressed by the master 1*a* and data transfer of which is controlled by the master 1a; and a serial data line 3 for performing data transfer between the master 1a and the slave 4a. In FIG. 1, a single slave 4a is solely shown. However, actually, a plurality of slaves 4 are connected to the serial data line 3 as shown in FIG. 6. Further, between the master 1a and the slave 4a, a serial clock line 2 of FIG. 6 is also arranged in addition to the serial data line 3.

Next, the operation of the communication system of the present embodiment is described below with reference to FIG. 1.

First, the operation of writing, into the slave 4a, data transmitted from the master 1a is described below. In FIG. 1, in the master 1a, transmission data 5a is processed by serial conversion in the serial converter 6, and then transmitted to the serial data line 3. The transmission data 5a consists of: data (7 bits) indicating a slave address 18 of the slave 4a; data write/read select data (1 bit) for the slave 4a; and data for controlling the slave 4a. The data write/read select data indicates that the data is written from the master 1a into the slave 4a. The transmission data 5a is processed by serial conversion in the order of the slave address data, the data write/read select data, and the slave control data.

The slave 4a determines that the slave 4a is addressed by the master 1a when the data indicating the slave address in the data 5a transmitted to the serial data line 3 agrees with the slave address 18. Then, the transmitted data 5a is processed by parallel conversion in the parallel converter 7 and then stored into the received data memory 8. The slave control data in the data 5a stored in the received data memory 8 is transmitted to various kinds of function control sections 9 so that the slave 4a is controlled on the basis of the slave control data. Then, the data write operation is completed.

Next, the operation is described that the master 1a reads data stored in the slave 4a. In FIG. 1, similarly to the above-mentioned write operation, the master 1a performs serial conversion on the transmission data 5a by using the serial converter 6, and then transmits the converted data to the serial data line 3. The transmission data 5a consists of slave address data (7 bits) of the slave 4a and data write/read select data (1 bit) for the slave 4a. Here, the data write/read select data indicates that the master 1a reads data from the slave 4a.

The serial conversion order controller 19 of the master 1a can generate a serial conversion selection control signal for controlling serial conversion order in the slave 4a and then include the signal into the transmission data 5a. As described above, this serial conversion order control signal is a signal for setting up serial conversion order for the data read from the slave 4a by the master 1a. By virtue of this signal, the master 1a can instruct the slave 4a with respect to the data read order.

Similarly to the prior art, the transmission data 5a is processed by serial conversion in the serial converter 6 in the order of the slave address data and the select data.

When the data indicating the slave address in the transmitted data 5a agrees with the slave address 18, the slave 4a receives the transmission data 5a. The data 5a is processed by parallel conversion in the parallel converter 7, and then stored into the received data memory 8. The select data in the transmission data 5a is transmitted from the received data memory 8 through the read instruction signal line 10 to the serial converter 15. In accordance with the select data that indicates data read, the slave 4a performs serial conversion on the system information data 12 in the slave 4a by using the serial converter 15, and then transmits the converted data to the serial data line 3.

Here, the serial conversion order control signal added by the serial conversion order controller 19 of the master 1a is transmitted from the received data memory 8 through the serial conversion order control signal line 17 to the serial conversion order setting unit 16 in the serial converter 15. In accordance with said serial conversion order control signal, the serial conversion order setting unit 16 determines serial conversion order for the system information data 12. In accordance with this determination, the serial converter 15 performs serial conversion.

The master 1a receives the data 12 transmitted to the serial data line 3, then performs parallel conversion on the received data by using the parallel converter 13, and then stores the converted data into the received data memory 14. The received data 12 is in a state having been processed by serial conversion in the order that the master 1a has instructed the slave 4a by using the serial conversion control signal. Thus, the master 1a can receive the data 12 in the instructed order. Then, the operation is completed that the master 1a reads data stored in the slave 4a.

Figure 2:
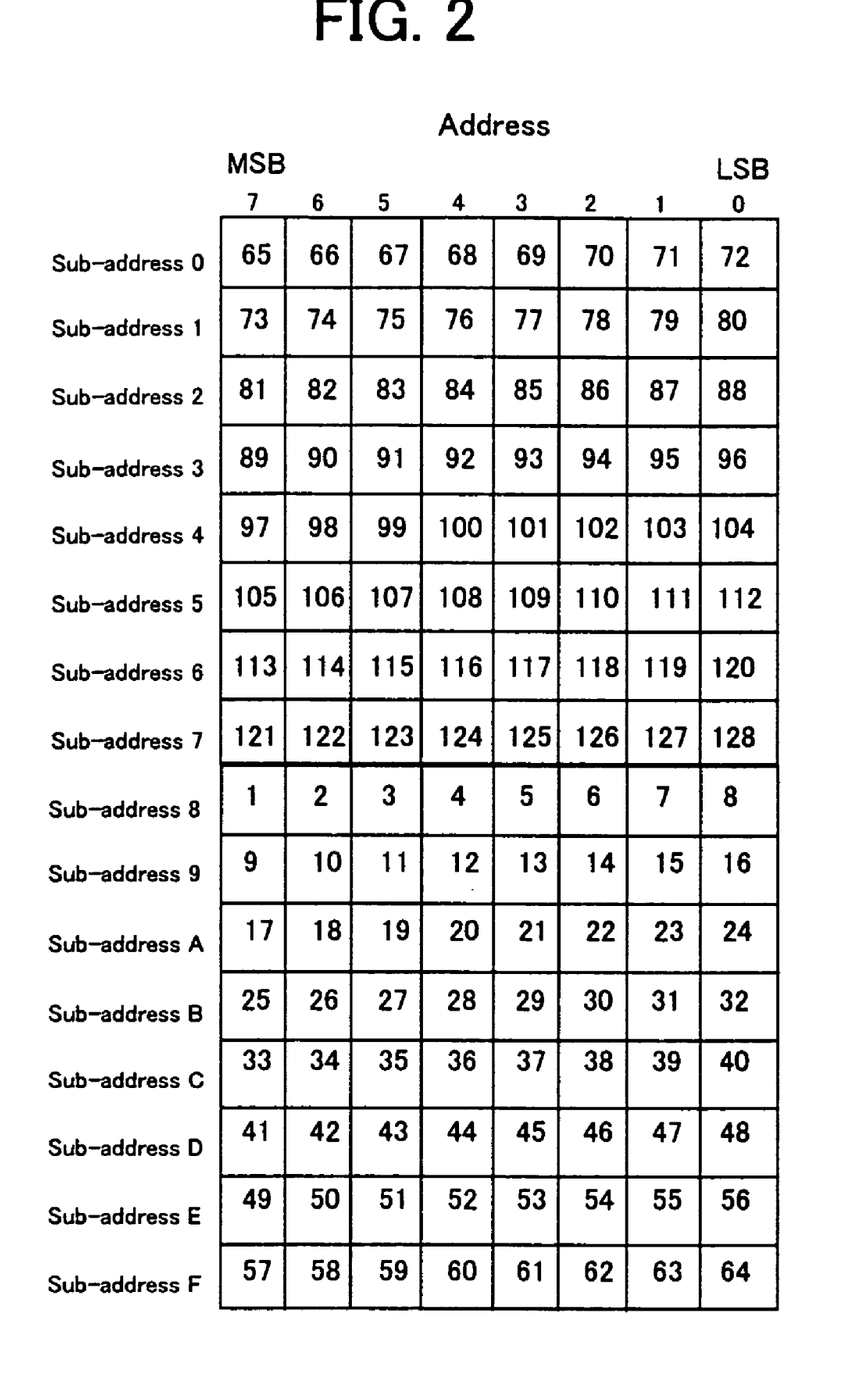
FIG. 2 is a diagram used for describing serial conversion order for system information data 12 of FIG. 1.

Next, the control of the above-mentioned serial conversion order is described below in detail. FIG. 2 shows new serial conversion order for the data map of the system information data 12 shown in FIG. 8. Similarly to the case of FIG. 8, numerals imparted to grid sections in FIG. 2 indicate the order of serial conversion. Whether the serial conversion is to be performed in the order shown in FIG. 8 or the serial conversion is to be performed in the order shown in FIG. 2 is controlled by the above-mentioned serial conversion order control signal. The serial conversion order control signal is added to the transmission data 5a by the serial conversion order controller 19, and then written into the received data memory 8 of the slave 4a. The serial conversion order control signal is transmitted to the serial conversion order setting unit 16 via the serial conversion order control signal line 17, so that serial conversion order is controlled. When the data of sub-address E and address 7 is necessary, the data is transmitted in the 113th turn according to the set-up order of FIG. 8. In contrast, when the serial conversion order shown in FIG. 2 is used, the above-mentioned data is transmitted in the 49th turn.

According to the first embodiment of the present invention, in a system for implementing data communication between a single master and a plurality of slaves through a single data transmission line (except for a clock signal line), the master instructs in advance a slave with respect to data read order in order that necessary data should be read from the slave with high priority, so that desired data can be read at a high speed.

Second Embodiment

A communication system according to a second embodiment of the present invention is described below with reference to the drawings. Here, the same or like components as those of the background art are designated by the same or like reference numerals.

Figure 3:
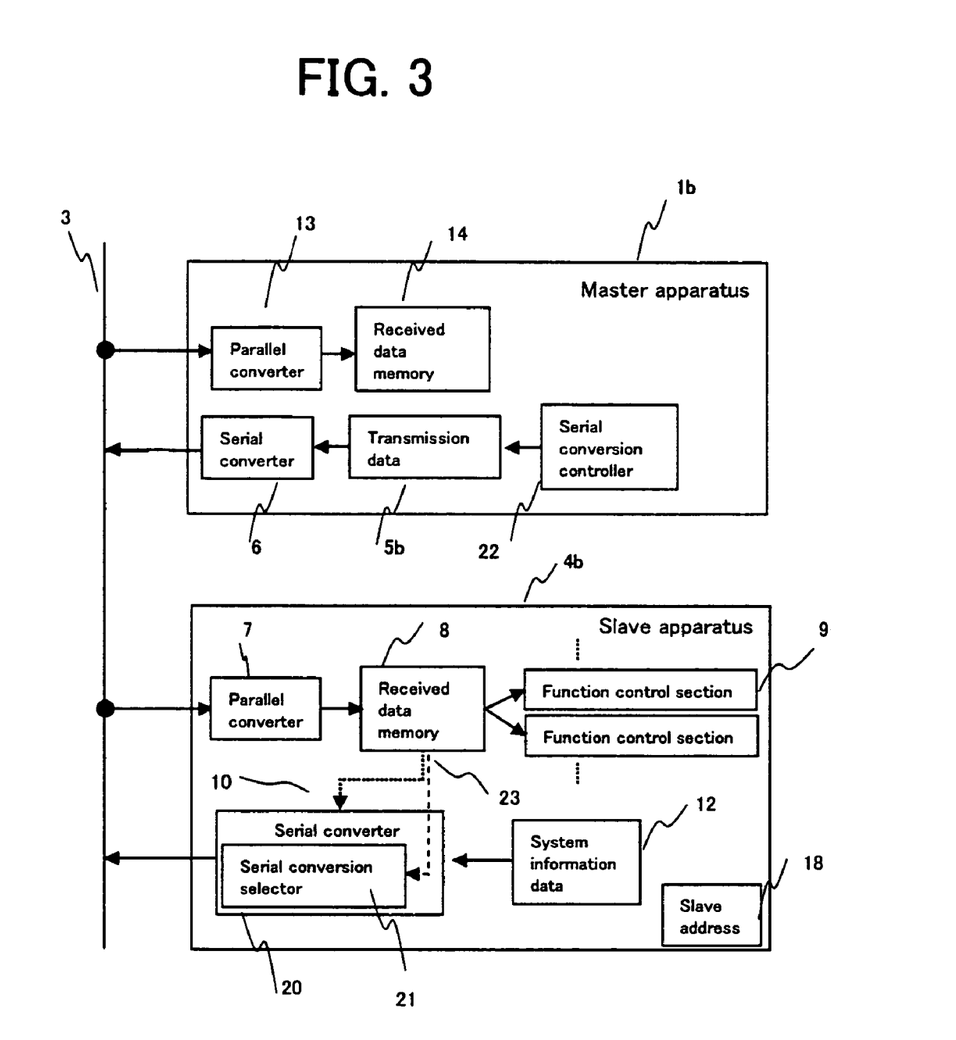
FIG. 3 is a diagram showing a configuration of a communication system according to a second embodiment of the present invention.

FIG. 3 is a diagram showing a configuration of a communication system according to a second embodiment of the present invention. The communication system according to the present embodiment comprises: a master 1b for controlling data transfer; a slave 4b which is addressed by the master 1b and data transfer of which is controlled by the master 1b; and a serial data line 3 for performing data transfer between the master 1b and the slave 4b. In FIG. 3, a single slave 4b is solely shown. However, actually, a plurality of slaves 4b are connected to the serial data line 3. Further, between the master 1b and each slave 4b, a serial clock line 2 of FIG. 6 is also arranged in addition to the serial data line 3.

Next, the operation of the communication system of the present embodiment is described below with reference to FIG. 3.

First, the operation of writing, into the slave 4b, data transmitted from the master 1b is described below. In FIG. 3, in the master 1b, transmission data 5b is processed by serial conversion in the serial converter 6, and then transmitted to the serial data line 3. The transmission data 5b consists of: data (7 bits) indicating a slave address 18 of the slave 4b; data write/read select data (1 bit) for the slave 4b; and data for controlling the slave 4b. The data write/read select data indicates that the data is written from the master 1b into the slave 4b. The transmission data 5b is processed by serial conversion in the order of the slave address data, the data write/read select data, and the slave control data.

The slave 4b determines that the slave 4b is addressed by the master 1b when the data indicating the slave address in the data 5b transmitted to the serial data line 3 agrees with the slave address 18. Then, the transmitted data 5b is processed by parallel conversion in the parallel converter 7 and then stored into the received data memory 8. The slave control data in the data 5b stored in the received data memory 8 is transmitted to various kinds of function control sections 9 so that the slave 4b is controlled on the basis of the slave control data. Then, the data write operation is completed.

Next, the operation is described that the master 1b reads data stored in the slave 4b. In FIG. 3, similarly to the above-mentioned write operation, the master 1b performs serial conversion on the transmission data 5b by using the serial converter 6, and then transmits the converted data to the serial data line 3. The transmission data 5b consists of slave address data (7 bits) of the slave 4b and data write/read select data (1 bit) for the slave 4b. Here, the data write/read select data indicates that the master 1b reads data from the slave 4b.

The serial conversion controller 22 can generate a serial conversion selection control signal for controlling which data is to be processed by serial conversion in the slave 4b, and then add the signal to the transmission data 5b. As described above, this serial conversion control signal is a signal for selecting data to be read from the slave 4b by the master 1b. By virtue of this signal, the master 1b can instruct the slave 4b with respect to data to be read.

Similarly to the prior art, the transmission data 5b is processed by serial conversion in the serial converter 6 in the order of the slave address data and the select data.

When the data indicating the slave address in the transmitted data 5b agrees with the slave address 18, the slave 4b receives the transmission data 5b. The data 5b is processed by parallel conversion in the parallel converter 7, and then stored into the received data memory 8. The select data in the transmission data 5b is transmitted from the received data memory 8 through the read instruction signal line 10 to the serial converter 20. In accordance with the select data that indicates data read, the slave 4b performs serial conversion on the system information data 12 in the slave 4b by using the serial converter 20, and then transmits the converted data to the serial data line 3.

Here, the serial conversion control signal added by the serial conversion controller 22 of the master 1b is transmitted from the received data memory 8 through the serial conversion control signal line 23 to the serial conversion selector 21 in the serial converter 20. On the basis of the serial conversion control signal, the serial conversion selector 21 selects data requested by the master 1b among the system information data 12. In accordance with this selection, the serial converter 20 performs serial conversion only on the necessary data.

The master 1b receives the selected part of the data 12 via the serial data line 3, then performs parallel conversion on the received data by using the parallel converter 13, and then stores the converted data into the received data memory 14. The received data consists solely of the data part requested by the master 1b. This remarkably reduces the necessary size of the memory 14 provided in the master 1b in comparison with the case that the entire data 12 is received. Then, the operation is completed that the master 1b reads data stored in the slave 4b.

Figure 4:
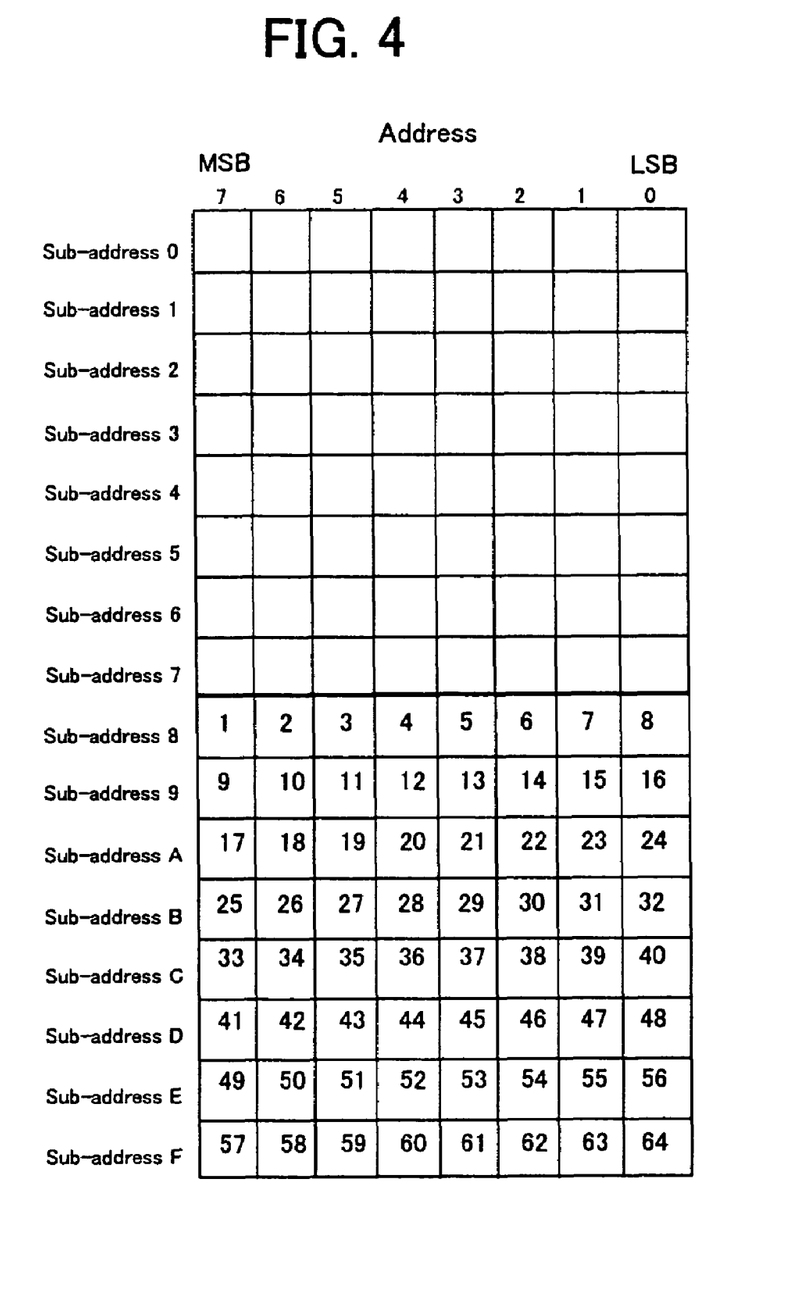
FIG. 4 is a diagram used for describing serial conversion order for system information data 12 of FIG. 3.
Figure 5:
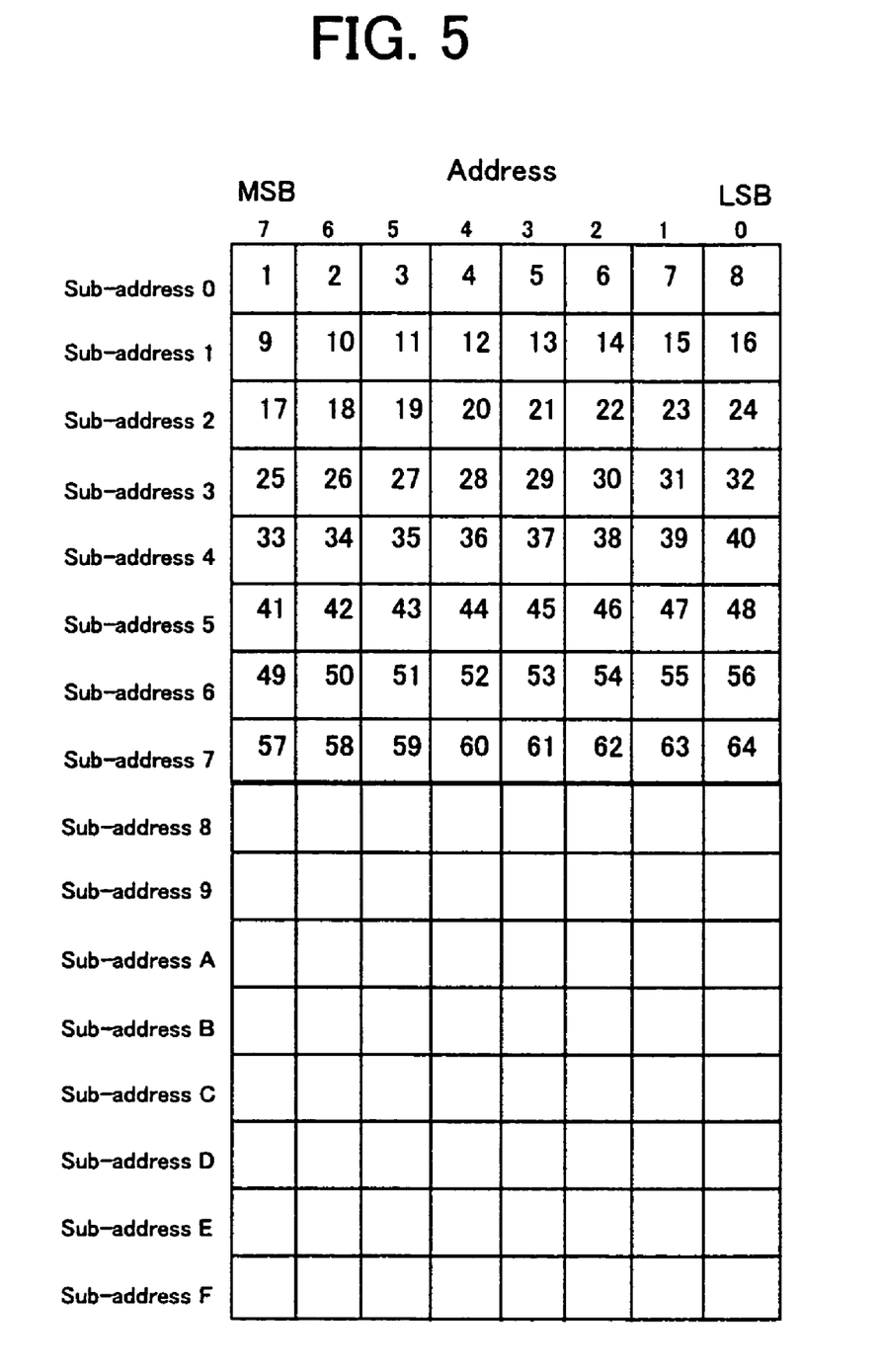
FIG. 5 is a diagram used for describing serial conversion order for system information data 12 of FIG. 3.

Next, the control of the above-mentioned serial conversion is described below in detail. First, FIGS. 4 and 5 shows new serial conversion order for the data map of the system information data 12 shown in FIG. 8. Similarly to the case of FIG. 8, numerals imparted to grid sections in FIGS. 4 and 5 indicate the order of serial conversion. In FIG. 8, the 128 pieces of data have been directly processed by serial conversion. In contrast, in each of FIGS. 4 and 5, serial conversion is performed only for 64 pieces of data. Whether the 64 pieces of data shown in FIG. 4 are to be converted by the serial converter 20 or the 64 pieces of data shown in FIG. 5 are to be converted by the serial converter 20 is controlled by the above-mentioned serial conversion control signal.

The serial conversion control signal is added to the transmission data 5b by the serial conversion controller 22, and then written into the received data memory 8 of the slave 4b. The serial conversion control signal is transmitted to the serial conversion selector 21 via the serial conversion control signal line 23, so that data to be processed by serial conversion among the system information data 12 is selected.

As such, when the master 1b instructs in advance the slave 4b to select the address of the read data, the memory size of the received data memory 14 of the master 1b can be reduced. In the present embodiment, the size of the received data memory can be reduced from 128 to 64.

As described above, according to the second embodiment of the present invention, in a system for implementing data communication between a master and a plurality of slaves by using a single data transmission line (except for a clock signal line), when the master instructs in advance the slave to select the address of read data, the size of the received data memory provided in the master can be reduced.

INDUSTRIAL APPLICABILITY

As described above, the present invention is useful in a two-way bus that has a simple structure including two wires and that realizes efficient control between semiconductor apparatuses such as ICs and LSIs.

The invention claimed is:

1. A communication system comprising:
a first apparatus for controlling data transfer;
a plurality of second apparatuses for exchanging data with said first apparatus; and
a data transmission line connected between said first apparatus and said second apparatuses, wherein
said first apparatus comprises:
a controller for generating a serial conversion order control signal for controlling serial conversion order for readable data when said readable data in said second apparatus is read;
a first serial converter for performing serial conversion on data containing said serial conversion order control signal, and then transmitting the converted data to said second apparatus; and
a first parallel converter for receiving the data generated by the serial conversion of said readable data performed by said second apparatus in accordance with said serial conversion order control signal, and then performing parallel conversion on the received data, and wherein said second apparatus comprises:
a second parallel converter for receiving the serial conversion data transmitted from said first apparatus and then performing parallel conversion on the received data;
a setting unit for setting up serial conversion order for said readable data in accordance with said serial conversion order control signal; and
a second serial converter for performing serial conversion on said readable data in accordance with said set-up serial conversion order and then transmitting the converted data to said first apparatus.

2. A master apparatus for controlling data transfer performed in a slave apparatus connected via a data transmission line, comprising:
a controller for generating a serial conversion order control signal for controlling serial conversion order for readable data when said readable data in said slave apparatus connected via said data transmission line is read;
a serial converter for performing serial conversion on data containing said serial conversion order control signal, and then transmitting the converted data to said slave apparatus; and
a parallel converter for receiving the data generated by the serial conversion of said readable data performed by said slave apparatus in accordance with said serial conversion order control signal, and then performing parallel conversion on the received data.

3. A slave apparatus in which data transfer is controlled by a master apparatus connected via a data transmission line, comprising:
a parallel converter for receiving serial conversion data transmitted from said master apparatus and then performing parallel conversion on the received data;
a setting unit for setting up serial conversion order for readable data in accordance with a serial conversion order control signal which is contained in said parallel conversion data and which controls serial conversion order for said readable data in said slave apparatus; and
a serial converter for performing serial conversion on said readable data in accordance with said set-up serial conversion order and then transmitting the converted data to said master apparatus.

4. A communication system comprising:
a first apparatus for controlling data transfer;
a plurality of second apparatuses for exchanging data with said first apparatus; and
a data transmission line connected between said first apparatus and said second apparatuses, wherein
said first apparatus comprises:
a controller for generating a serial conversion selection control signal for controlling selection of data to be processed by serial conversion among readable data when said readable data in said second apparatus is read;
a first serial converter for performing serial conversion on data containing said serial conversion selection control signal, and then transmitting the converted data to said second apparatus;
a first parallel converter for receiving the data generated by the serial conversion of a part of said readable data performed by said second apparatus in accordance with said serial conversion selection control signal, and then performing parallel conversion on the received data; and
a memory for temporarily holding said parallel conversion data, and wherein said second apparatus comprises:
a second parallel converter for receiving the serial conversion data transmitted from said first apparatus and then performing parallel conversion on the received data;
a selector for selecting data to be processed by serial conversion among said readable data in accordance with said serial conversion selection control signal; and
a second serial converter for performing serial conversion on said selected data and then transmitting the converted data to said first apparatus.

5. A master apparatus for controlling data transfer performed in a slave apparatus connected via a data transmission line, comprising:
a controller for generating a serial conversion selection control signal for controlling selection of data to be processed by serial conversion among readable data when said readable data in said slave apparatus connected via said data transmission line is read;
a serial converter for performing serial conversion on data containing said serial conversion selection control signal, and then transmitting the converted data to said slave apparatus;
a parallel converter for receiving the data generated by the serial conversion of a part of said readable data performed by said slave apparatus in accordance with said serial conversion selection control signal, and then performing parallel conversion on the received data; and
a memory for temporarily holding said parallel conversion data.

6. A slave apparatus in which data transfer is controlled by a master apparatus connected via a data transmission line, comprising:
a parallel converter for receiving serial conversion data transmitted from said master apparatus and then performing parallel conversion on the received data;
a selector for selecting data to be processed by serial conversion among readable data in accordance with a serial conversion selection control signal which is contained in said parallel conversion data and which controls selection of data to be processed by serial conversion among said readable data in said slave apparatus; and
a serial converter for performing serial conversion on said selected data and then transmitting the converted data to said master apparatus.

7. A communication method used in a configuration provided with: a first apparatus for controlling data transfer; a plurality of second apparatuses for exchanging data with said first apparatus; and a data transmission line connected between said first apparatus and said second apparatuses, comprising the steps of:
generating, in said first apparatus, a serial conversion order control signal for controlling serial conversion order for readable data when said first apparatus reads said readable data in said second apparatus;
transferring data containing said serial conversion order control signal from said first apparatus through said transmission line to said second apparatus;
setting up serial conversion order for readable data in accordance with said serial conversion order control signal and then performing, in said second apparatus, serial conversion on said readable data in accordance with said set-up order;
transferring said serial conversion data from said second apparatus through said transmission line to said first apparatus; and
performing parallel conversion on said serial conversion data in said first apparatus.

8. A communication method used in a configuration provided with: a first apparatus for controlling data transfer; a plurality of second apparatuses for exchanging data with said first apparatus; and a data transmission line connected between said first apparatus and said second apparatuses, comprising the steps of:

generating, in said first apparatus, a serial conversion selection control signal for controlling selection of data to be processed by serial conversion among readable data when said first apparatus reads said readable data in said second apparatus;

transferring data containing said serial conversion selection control signal from said first apparatus through said transmission line to said second apparatus;

selecting data to be processed by serial conversion among said readable data in accordance with said serial conversion selection control signal, and then performing serial conversion on said selected data in said second apparatus;

transferring said serial conversion data from said second apparatus through said transmission line to said first apparatus;

performing parallel conversion on said serial conversion data in said first apparatus; and temporarily storing said parallel conversion data into a memory in said first apparatus.

* * * * *